(12) United States Patent
Mohebbi et al.

(10) Patent No.: US 6,965,772 B1
(45) Date of Patent: Nov. 15, 2005

(54) BACKHAUL IN CELLULAR MOBILE COMMUNICATIONS NETWORK

(75) Inventors: Behzad Mohebbi, San Diego, CA (US); Sunil Keshavji Vadgama, Croydon (GB)

(73) Assignee: Fujitsu Limited, Kawasaki (JP)

( * ) Notice: Subject to any disclaimer, the term of this patent is extended or adjusted under 35 U.S.C. 154(b) by 783 days.

(21) Appl. No.: 09/704,504

(22) Filed: Nov. 2, 2000

Related U.S. Application Data (63) Continuation of application No. PCT/GB99/01340, filed on Apr. 28, 1999.

(30) Foreign Application Priority Data

May 14, 1998 (GB) ..................................... 9810426

(51) Int. Cl.[7] ............................. H04Q 7/20; H04Q 7/34
(52) U.S. Cl. ..................... 455/442; 455/436; 455/423; 455/424; 455/67.11; 455/422.1; 455/560; 370/248
(58) Field of Search ............................. 455/403, 422.1, 455/432.1, 432.2, 436–444, 517, 561.1, 550.1, 455/445, 423, 424, 425, 9, 500, 524, 67.11, 455/560, 561; 370/248

(56) References Cited

U.S. PATENT DOCUMENTS

| | | | |
|---|---|---|---|
| 5,309,503 A | | 5/1994 | Bruckert et al. |
| 5,432,843 A | | 7/1995 | Bonta |
| 5,548,808 A | * | 8/1996 | Bruckert et al. ............ 455/442 |
| 5,697,055 A | * | 12/1997 | Gilhousen et al. .......... 455/436 |
| 5,734,967 A | * | 3/1998 | Kotzin et al. ............. 455/63.1 |
| 5,884,176 A | * | 3/1999 | Vaara ........................ 455/438 |
| 6,078,809 A | * | 6/2000 | Proctor ....................... 455/416 |

FOREIGN PATENT DOCUMENTS

| | | |
|---|---|---|
| EP | 0 577 322 | 1/1994 |
| EP | 0 645 940 | 3/1995 |
| EP | 0 797 367 | 9/1997 |
| GB | 2 012 525 | 7/1979 |
| GB | 2 242 337 | 9/1991 |
| JP | 5-295359 | 11/1993 |
| JP | 6-132080 | 5/1994 |
| JP | 7-053955 | 2/1995 |
| JP | 7-119407 | 5/1995 |
| JP | 7-272854 | 10/1995 |
| JP | 7-288184 | 10/1995 |
| JP | 8-048656 | 2/1996 |
| JP | 8-053397 | 2/1996 |

(Continued)

OTHER PUBLICATIONS

C.W. Tang and S.A. Vanslyke; Organic electroluminescent diodes; Appl. Phys. Lettr. 51(12), Sep. 21, 1987; pp. 913-915.

*Primary Examiner*—Keith Ferguson
(74) *Attorney, Agent, or Firm*—Katten Muchin Rosenman LLP

(57) ABSTRACT

A cellular mobile communications network includes a base station controller and an array of base transceiver stations. Each base transceiver station has a communications path connecting it to the base station controller such that when an uplink signal is received from a mobile station of the network by a plurality of the base transceiver stations of the array, each base transceiver station can transfer the received uplink signal via its communications path to the base station controller. The communications paths are assessed according to predetermined characteristics, and based on this assessment, at least one base transceiver station of the plurality is prevented from transferring the received uplink signal to the base station controller.

54 Claims, 4 Drawing Sheets

FOREIGN PATENT DOCUMENTS

| | | |
|---|---|---|
| JP | 8-199162 | 8/1996 |
| JP | 2554771 | 8/1996 |
| JP | 8-286033 | 11/1996 |
| JP | 8-333283 | 12/1996 |
| JP | 8-333569 | 12/1996 |
| JP | 10-088121 | 4/1998 |
| JP | 2795932 | 6/1998 |
| WO | 93/19537 | 9/1993 |
| WO | 95/04420 | 2/1995 |
| WO | 95/32594 | 11/1995 |
| WO | 96/08119 | 3/1996 |
| WO | 96/18277 | 6/1996 |
| WO | 97/08911 | 3/1997 |
| WO | 97/41652 | 11/1997 |
| WO | 98/15152 | 4/1998 |

\* cited by examiner

BACKHAUL IN CELLULAR MOBILE COMMUNICATIONS NETWORK

This is continuation of PCT application Serial No PCT/GB99/01340 filed on Apr. 28, 1999

BACKGROUND OF THE INVENTION

1. Field of the Invention

The present invention relates to cellular mobile % communication networks, for example Code Division Multiple Access (CDMA) cellular networks.

2. Summary of the Related Art

Figures 1, 2:
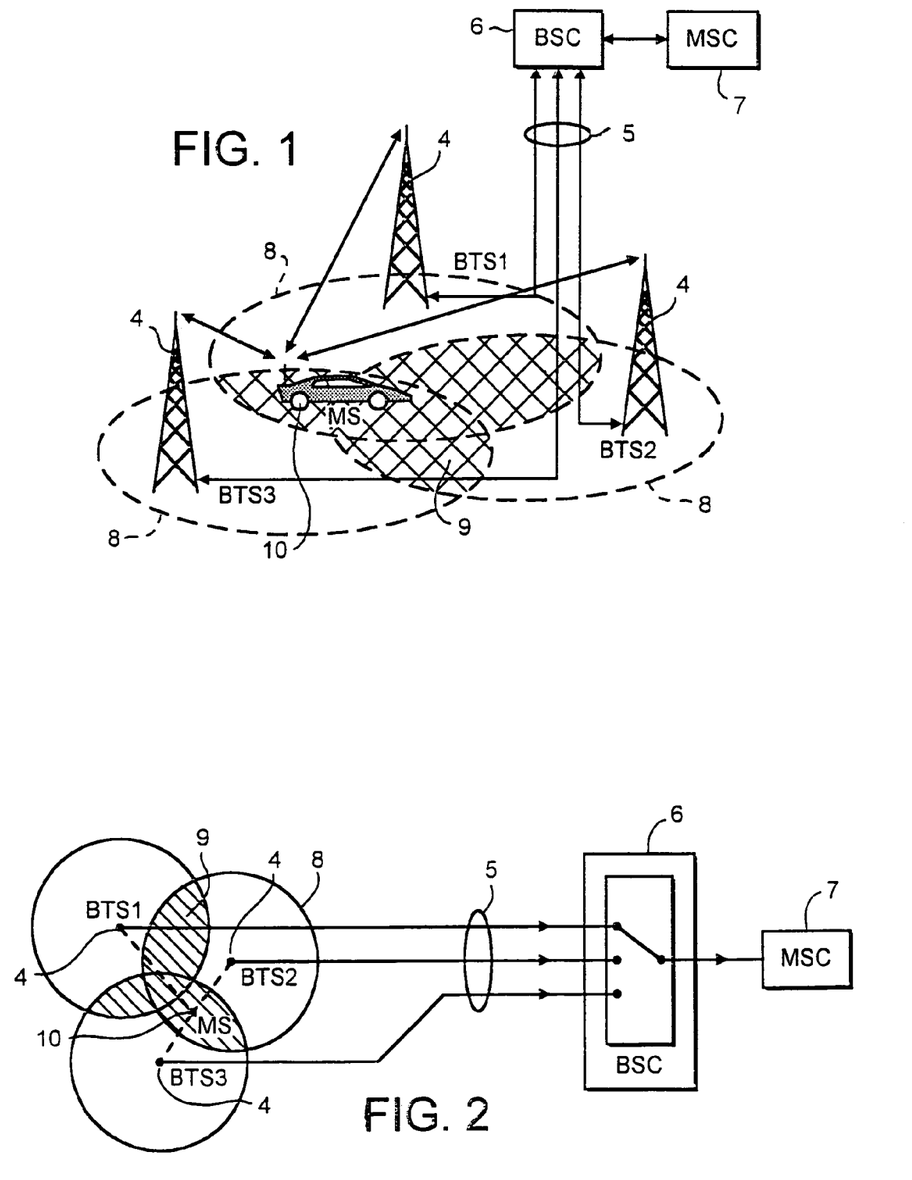
FIG. 1, discussed hereinbefore, shows parts of a cellular mobile telecommunication network according to IS95.
FIG. 2, also discussed hereinbefore, shows a schematic view for use in explaining processing of uplink signals in a soft hand-off operation performed by the FIG. 1 network.

FIG. 1 of the accompanying drawings shows parts of a cellular mobile telecommunication network according to the Telecommunication Industries Association (TIA)/Electronic Industries Association (EIA) Standard TIA/EIA/IS-95 of October 1994 (hereinafter "IS95"). Each of three base transceiver stations (BTSs) 4 (BTS1, BTS2 and BTS3) is connected via a fixed network 5 to a base station controller (BSC) 6, which is in turn connected to a mobile switching centre (MSC) 7. The BSC 6 serves to manage the radio resources of its connected BTSs 4, for example by performing hand-off and allocating radio channels. The MSC 7 serves to provide switching functions and coordinates location registration and call delivery.

Each BTS 4 serves a cell 8. When a mobile station (MS) 10 is in a so-called "soft hand-off" (SHO) region 9 where two or more cells overlap, a mobile station can receive transmission signals (downlink signals) of comparable strength and quality from the respective BTSs of the overlapping cells. Transmission signals (uplink signals) produced by the mobile station (MS) can also be received at comparable strengths and qualities by these different BTSs when the mobile station is in the SHO region 9.

FIG. 2 of the accompanying drawings shows a situation where the MS 10 is located within the SHO region 9, and is transmitting such uplink signals that are being received by plural BTSs 4. According to the IS95 standard, a BTS 4 that receives such an uplink signal from the MS 10 relays the signal to the BSC 6 via a dedicated communications path of the fixed network 5. At the BSC 6, one of the relayed signals is selected based on a comparison of the quality of each of the received signals, and the selected signal is relayed to the MSC 7. This selection is referred to as Selection Diversity.

Figure 3:
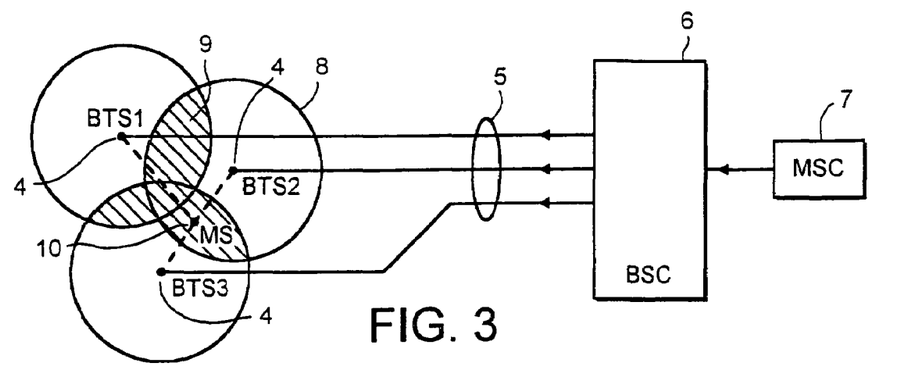
FIG. 3, also discussed hereinbefore, shows a schematic view for use in explaining processing of downlink signals in such a soft hand-off operation.

Similarly, FIG. 3 of the accompanying drawings shows a situation where the MS 10 is located within the SHO region 9 and is receiving downlink signals from plural BTSs 4. According to the IS95 standard, downlink signals received by the BSC 6 from the MSC 7 are relayed to all BTSs 4 involved in the soft hand-off via respective communication paths of the fixed network and subsequently transmitted by all the BTSs 4 to the MS 10. At the MS 10 the multiple signals may be combined, for example, by using maximum ratio combination (MRC), or one of them may be selected based on the signal strength or quality, i.e. using Selection Diversity as for the uplink case.

Incidentally, signals are transmitted as a succession of frames according to the IS95 standard.

Figure 4:
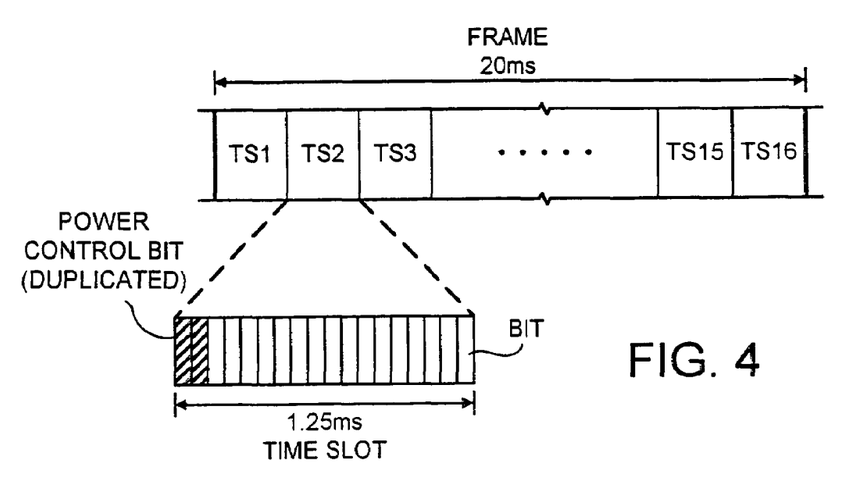
FIG. 4, also discussed hereinbefore, illustrates the format of a time frame in the FIG. 1 network.

As FIG. 4 of the accompanying drawings shows, each frame is of duration 20 ms, and comprises sixteen 1.25 ms time slots. In each time slot several bits of user data and/or control information can be transmitted.

The soft hand-off system described above is effective in improving signal transmission between the MS 10 and the network when the MS 10 is located in regions of cell overlap near the boundaries of the individual cells. Signal quality in these regions when using a single BTS 4 may be relatively poor, but by making use of more than one BTS 4 the quality may be substantially improved.

However, in IS95 it is necessary to transmit signals carrying the same data and/or control information between the BSC 6 and every BTS 4 involved in the soft hand-off for both the uplink and downlink cases described above, even when one or more of the communications paths (which may be of different type, e.g. electrical, fibre optic or microwave) in the fixed network may be experiencing adverse transmission conditions, for example heavy traffic congestion or poor transmission quality. In addition, the cost associated with the use of certain lines may fluctuate. In view of this, a soft hand-off system as described above may be expensive to operate both in terms of cost and traffic congestion.

SUMMARY OF THE INVENTION

According to a first aspect of the present invention there is provided a cellular mobile communications network including: base station controller means; an array of base transceiver stations, each having a communications path connecting it to the said base station controller means, such that when an uplink signal is received from a mobile station of the network by a plurality of the base transceiver stations of the said array, each base transceiver station of the said plurality can transfer the received uplink signal via its said communications path to the said base station controller means; communications path assessment means for assessing the said communications paths according to one or more predetermined characteristics; and communications path disabling means operable, based on the assessment of the communications paths, to prevent at least one base transceiver station of the said plurality from transferring the received uplink signal to the said base station controller means.

According to a second aspect of the present invention there is provided a base station controller, for use in a cellular mobile communications network that includes an array of base transceiver stations, each having a communications path connecting it to the base station controller such that, when an uplink signal is received from a mobile station of the network by a plurality of the base transceiver stations of the array, each of those base transceiver stations can transfer the received uplink signal via its said communications path to the base station controller, which base station controller includes: communications path assessment means for assessing the said communications paths according to one or more predetermined characteristics; and informing means for generating assessment signals indicating the results of the assessment of the said communications paths and for transmitting such assessment signals to the base transceiver stations of the said plurality.

According to a third aspect of the present invention there is provided a base transceiver station, for use in a cellular mobile communications network in which an array of base transceiver stations including the claimed base transceiver station are connected to base station controller means of the network by respective communications paths such that when an uplink signal is received from a mobile station by a plurality of the base transceiver stations of the array, each of those base transceiver stations can transfer the received uplink signal via its said communications path to the said base station controller means; the claimed base transceiver station including: communications path disabling means operable, based on an assessment of the said communications paths according to one or more predetermined characteristics thereof, to prevent the claimed base transceiver station from transferring the received uplink signal to the said base station controller means.

According to a fourth aspect of the present invention there is provided a communications method for use in a cellular mobile communications network that includes an array of base transceiver stations, each having a communications path connecting it to base station controller means of the network such that, when an uplink signal is received from a mobile station by a plurality of the base transceiver stations of the array, each of those base transceiver stations can transfer the received uplink signal via its said communications path to the said base station controller means; in which communications method: the said communications paths are assessed according to one or more predetermined characteristics; and based on the assessment of the communications paths at least one base transceiver station of the said plurality is prevented from transferring the received uplink signal to the base station controller means.

According to a fifth aspect of the present invention there is provided a cellular mobile communications network including: base station controller means; an array of base transceiver stations, each having a communications path connecting it to the said base station controller means such that, when a downlink signal for transmission to a mobile station of the network is produced by the said base station controller means, that downlink signal can be transferred to a plurality of the base transceiver stations of the said array via the respective said communications paths thereof; communications path assessment means for assessing the said communications paths according to one or more predetermined characteristics; and communications path disabling means operable, based on the assessment of the said communications paths, to prevent the said base station controller means from transferring the said downlink signal to at least one of the said base transceiver stations of the said plurality.

According to a sixth aspect of the present invention there is provided a base station controller, for use in a cellular mobile communications network that includes an array of base transceiver stations, each having a communications path connecting it to the base station controller such that, when a downlink signal for transmission to a mobile station of the network is produced by the base station controller, that signal can be transferred to a plurality of the base transceiver stations of the array via the respective said communications paths thereof, which base station controller includes: communications path disabling means operable, based on an assessment of the said communications paths according to one or more predetermined characteristics thereof, to prevent transfer of the said downlink signal to at least one of the said base transceiver stations of the said plurality.

According to a seventh aspect of the present invention there is provided a base transceiver station, for use in a cellular mobile communications network in which an array of base transceiver stations including the claimed base transceiver station are connected to base station controller means of the network by respective communications paths such that, when a downlink signal for transmission to a mobile station of the network is produced by the base station controller means, that signal can be transferred to a plurality of the base transceiver stations of the array via the respective said transmission paths thereof; the claimed base transceiver station including: communications path assessment means for assessing the said communications path according to one or more predetermined characteristics; and informing means for generating assessment signals indicating the results of the assessment of the communications paths and for transmitting such assessment signals to the base station controller means.

According to an eighth aspect of the present invention there is provided a communications method for use in a cellular mobile communications network that includes an array of base transceiver stations, each having a communications path connecting it to base station controller means of the network such that, when a downlink signal for transmission to a mobile station of the network is produced by the base station controller means, that signal can be transferred to a plurality of the base transceiver stations of the array via the respective said communications paths thereof; in which method: the said communications paths are assessed according to one or more predetermined characteristics thereof; and based on the assessment of the communications paths, the base station controller means are prevented from transferring the said downlink signal to at least one of the base transceiver stations of the said plurality.

DETAILED DESCRIPTION OF THE PREFERRED EMBODIMENTS

Figure 5:
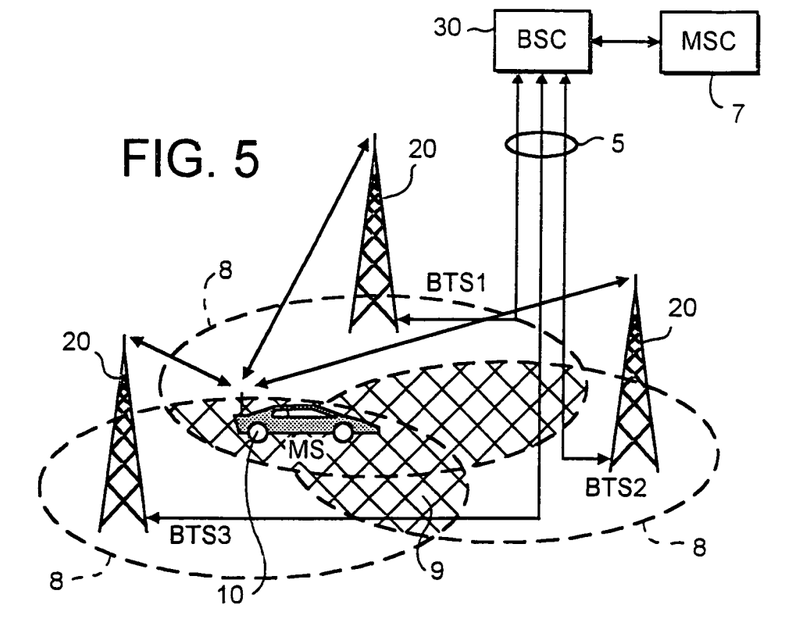
FIG. 5 shows parts of a mobile telecommunication network embodying the present invention.

FIG. 5 shows parts of a mobile telecommunication network embodying the present invention. In FIG. 5, elements that are the same as elements of the FIG. 1 network described previously have the same reference numerals and an explanation thereof is omitted.

The FIG. 5 network is a wideband CDMA network for a proposed new standard for mobile telecommunications referred to as a universal mobile telecommunications system (UMTS) or UMTS terrestrial radio access (UTRA). This is generally similar to the IS95-standard network described previously, although certain implementation details are yet to be finalised. Details that are different from IS95 include the frame duration, which is 10 ms, and the time-slot duration which is 625 $\mu$s. The overall bit rate is within the range from 8 kbits/s to 2 Mbits/s.

The preferred embodiment will be described in relation to a wideband CDMA network operating in a soft hand-off mode, but other embodiments are not restricted to operation in the soft hand-off mode or even in such a network. For example the present invention may be applied to a Global System for Mobile Communication (GSM) network in the case where a mobile station is within communication range of more than one BTS.

In FIG. 5, each of three base transceiver stations (BTSs) 20 (BTS1, BTS2 and BTS3) is connected via a fixed network 5 to a base station controller (BSC) 30, which is in turn connected to a mobile switching centre (MSC) 7. Each BTS 20 serves a cell 8. A mobile station (MS) 10 is in a soft hand-off (SHO) region 9 and can receive downlink signals from, and transmit uplink signals to, all the BTSs 20 involved in the soft hand-off.

The FIG. 5 network corresponds generally with the FIG. 1 network, but the BTSs 20 and BSC 30 are constructed and operate differently from the corresponding elements in FIG. 1.

Figures 6, 7:
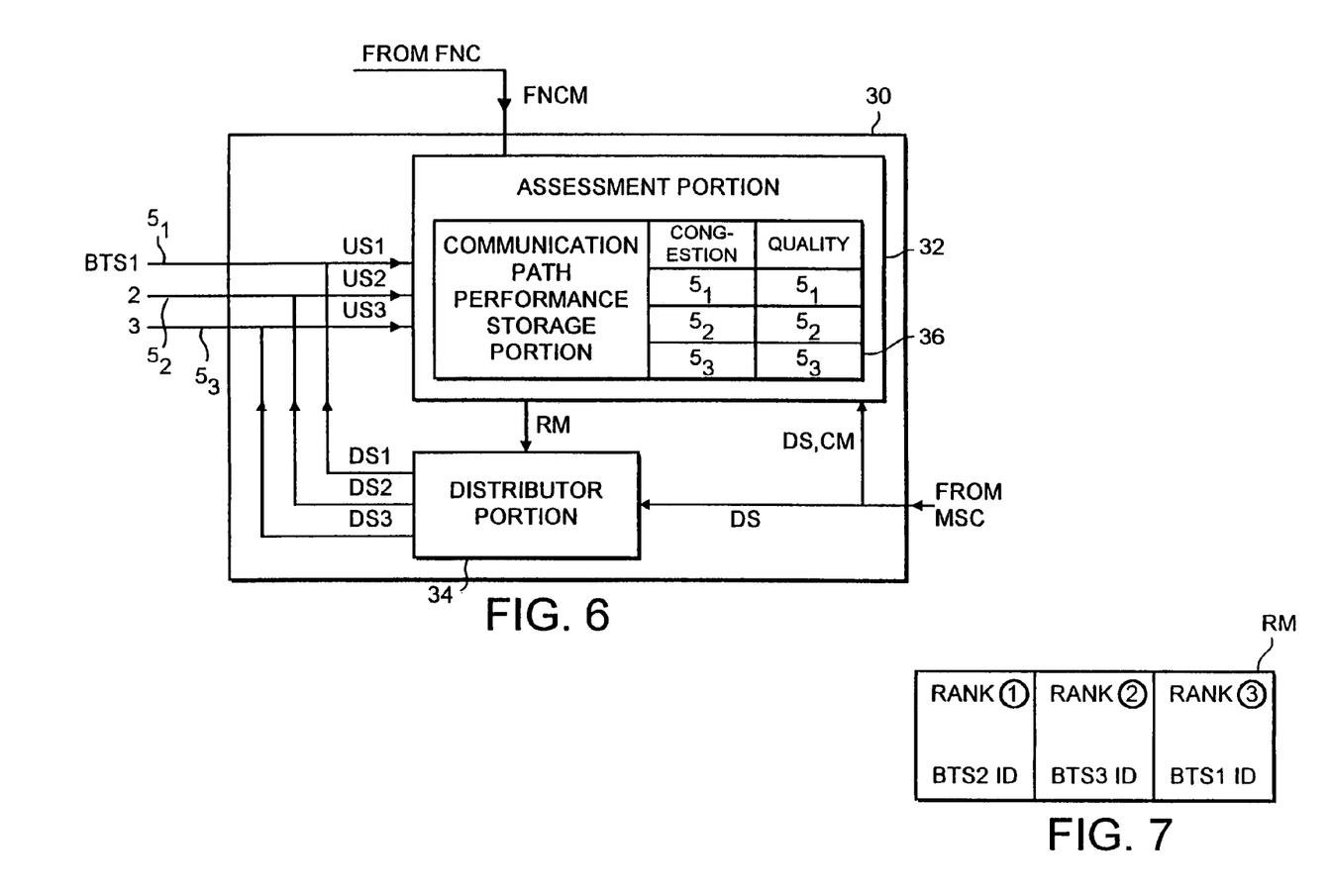
FIG. 6 shows parts of a base station controller embodying the present invention.
FIG. 7 is a schematic diagram showing one possible format of a ranking message produced by the FIG. 6 base station controller.

FIG. 6 shows one example of the construction of the BSC 30 in FIG. 5. The BSC 30 includes an assessment portion 32 and a distributor portion 34. The assessment portion 32 includes a communications path performance (CPP) storage portion 36.

In this example, it is assumed that the communications paths $5_1$ to $5_3$ linking each BTS to the BSC 30 are duplex lines which carry respective uplink and downlink signals US and DS between the BTS concerned and the BSC. For example, a first one of the communications path $5_1$ carries respective uplink and downlink-signals US1 and DS1 between the BTS1 and the BSC 30.

In this example, it is also assumed that the fixed network which provides the communications paths $5_1$ to $5_3$ includes a fixed network controller (FNC) that monitors the performance of the communications paths and makes information available to network units such as the MSC 7 and the BSC 30 regarding such communications-path performance. For example, the fixed network controller may generate predetermined types of control signal (hereinafter referred to generically as fixed network control messages (FNCMs)) for informing the network units of conditions affecting the performance of the communications paths. Such conditions include congestion, availability and quality.

In an asynchronous transfer mode (ATM) network, for example, the ATM cell traffic transmitted through a communications path may contain control signals such as forward explicit congestion notifications (FECNs) or fast resource management (FRM) cells.

The assessment portion 32 has three inputs connected respectively to the communications paths $5_1$ to $5_3$ for receiving uplink signals US1 to US3 from BTS1 to BTS3 respectively. The assessment portion 32 also has inputs from the FNC (to receive the FNCMs) and from the MSC 7 (to receive downlink signals DS including s control message CM therefrom), and also has an output connected to an input of the distributor portion 34 for applying thereto a ranking message RM.

The distributor portion 34 receives at its input the downlink signals DS supplied by the MSC (7 in FIG. 5), and has three outputs connected respectively to the communications paths $5_1$ to $5_3$.

In operation of the BSC 30 shown in FIG. 6, the assessment portion 32 continuously assesses the performance of the communications paths $5_1$ to $5_3$ and maintains one or more measures of the performance of each of these communications paths (CPP measures). For example, the CPP measures may include measures of congestion, quality, availability and cost. In particular, CPP quality measures may include data (or bit) error rate, path delay and jitter. CPP availability measures may include a downtime of the communications path. CPP cost measures may include the network operator's charge per time slot (which may vary according to the time of day etc.). The CPP measure(s) for each communications path are held in the CPP storage portion 36 in storage regions corresponding respectively to the communications paths $5_1$ to $5_3$. In the example shown in FIG. 6 itself, the CPP storage portion 36 has two sets of storage regions, the first set for CPP congestion measures and the second set for CPP quality measures.

In order to update the CPP measures the assessment portion 32 may use information from various sources. The first of these sources is internally-generated information regarding the communications paths, which is available within the BSC 30 as the BSC 30 is itself a network unit. To this end, the assessment portion 32 receives the three uplink signals US1 to US3 from the BTSs 20 involved in the soft hand-off operation. When a suitable uplink signal is received via one of the communications paths $5_1$ to $5_3$, the assessment portion 32 examines the signal, for example calculating its data (or bit) error rate, path delay or jitter, and employs the results of the examination to update the relevant CPP measure(s) for the communications path concerned. The resulting updated measure(s) is (are) stored in the CPP storage portion 36.

At various times, the assessment portion may also receive one of the above-mentioned FNCMs, and this is used as a second source of information for updating the CPP measures held in the storage portion 36.

In addition, the assessment portion 32 monitors the downlink signals received from the MSC for control messages (CMs) included therein which may from time to time contain further instructions from the MSC 7 regarding the future use of each of the communication lines $5_1$ to $5_3$. When such a CM is detected, the relevant CPP measure held in the CPP storage portion 36 is updated accordingly.

Based on the CPP measures stored in the CPP storage portion 36, the assessment portion 32 ranks the communication paths $5_1$ to $5_3$. For example, the communications paths could be ranked according to a CPP cost measure alone, so that high-cost paths would be ranked lower than low-cost paths. Alternatively, a more sophisticated combination of CPP measures could be used to formulate the ranking. For example the cost, the path delay and the data error rate CPP measures could all be made to influence the ranking, and the relative importance of each of these measures could be varied.

A ranking message (RM) indicating the rank applied to each path is formed and output to the distributor portion 34. FIG. 7 shows an example of the format of the ranking message. An identifier for each communications path is placed within the RM in the above-determined rank order. In this example the identifier is the BTS identification number of the BTS that is connected to the BSC 30 by the communications path having the particular rank. This BTS identification number is unique to each BTS 20.

The distributor portion 34 serves to relay downlink signals from the MSC 7 to the BTSs 20. When a RM is received at the RM input of the distributor portion 34, the ranking message is communicated to all BTSs 20 (BTS1 to BTS3) via the respective communication lines $5_1$ to $5_3$.

Figure 8:
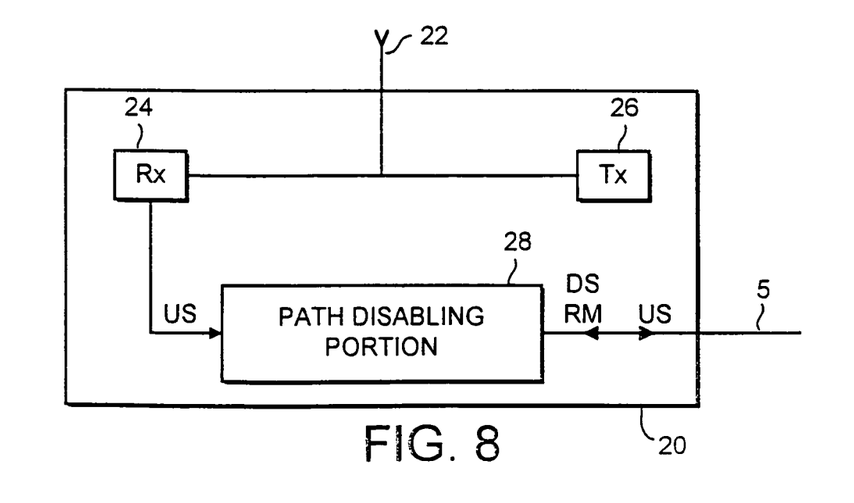
FIG. 8 shows parts of a base transceiver station embodying the present invention.

FIG. 8 shows parts of a BTS 20 embodying the present invention. This BTS 20 is specially adapted to receive and process the ranking message RM sent by the BSC 30.

An antenna element 22 is connected (e.g. via a duplexer not shown) to a receiver portion 24 and a transmitter portion 26. A path disabling portion 28 receives an uplink signal US from the receiver portion 24, and in turn applies the received US (or a signal derived therefrom) to its fixed-network communications path 5 for transmission to the BSC 30.

The path disabling portion 28 also receives a downlink signal from the BSC 30. In use of the BTS 20, these downlink signals may include, from time to time, a ranking message RM.

When such a ranking message RM is received and detected by the BTS 20, the path disabling portion 28 processes it to determine the rank of its communication path within the ranking order determined by the BSC 30.

Using this ranking, the path disabling portion 28 in the BTS 20 is able to decide whether or not, in the next time slot, to forward an uplink signal US received from the receiver portion 24 (or a signal derived therefrom) to the BSC 30 via its fixed-network communications path 5. For example, in a simple case, if the deciding BTS 20 has the highest-ranked communications path, it will decide to transmit the uplink signal; if it has the lowest-ranked path it will decide not to transmit the uplink signal.

In this example, each BTS 20 has knowledge of the rank of the communications path of every other BTS 20 involved in the soft hand-off, but makes the decision of whether or not to transmit the next uplink signal US independently of the other BTSs 20. Therefore, it must be ensured that the decisions made at each BTS 20 are consistent with each other.

It will be understood that a situation could arise in which the BTS with the highest-ranked path to the BSC has received a poor quality uplink signal US from the mobile station, for example due to fading. To deal with this situation, a more sophisticated approach to the BTS decision-making could be adopted. In this approach, a mechanism is provided for enabling each BTS involved in the soft hand-off to have knowledge to the respective uplink-channel performances of all the other involved BTSs. A mechanism for achieving this is described, for example, in our PCT publication no. WO 99/59376, the entire content of which is incorporated herein by reference. In that mechanism a power control message (PCM) made up of the uplink power control bits (PCBs) of all the BTSs involved in the soft hand-off operation is transmitted in each time slot by the mobile station to the involved BTSs. With the benefit of this knowledge of the uplink-channel performances of the other involved BTSs, each BTS can be aware of the situation identified above in which the BTS with the highest-ranked path has received an inadequate uplink signal. Thus, another BTS (with a lower-ranked path) can send the uplink signal in this case, or possibly all BTSs could send the uplink signal with MRC being used in the BSC.

It will also be appreciated that, instead of broadcasting a ranking message RM to all the involved BTSs 20, the assessment portion 32 of the BSC 30 of FIG. 6 may produce three individual BTS selection messages (BSMs) for transmission to the involved BTSs 20 via their respective fixed communications paths $5_1$ to $5_3$. Each BSM instructs the receiving BTS 20 directly either to transmit or not to transmit a subsequently-received uplink signal back to the BSC 30. In this way, since it is the BSC 30 which is making the decision for all BTSs 20 involved in the soft hand-off, there is an inherent consistency in the actions taken by the path disabling portions 28 of each BTS 20 when selecting communications paths for uplink signal transmission.

In the embodiment of the present invention described above the communications path assessment portion 32 is contained within the BSC 30, and the path disabling portion 28 is contained within the BTS 20, but it will also be appreciated that other possibilities exist.

For example, there may be an assessment portion contained within the BTS 20 which may be used for deciding whether or not to transmit uplink signals to the BSC 30. If, for example, the communications path 5 from a particular BTS 20 to the BSC 30 is of a type not suitable for transmission of, say, video data, then when that particular BTS 20 determines that an uplink signal received by it from a mobile station contains video data, that BTS 20 may decide not to transmit the uplink signal to the BSC 30. Consequently, an assessment portion contained within the BTS 20 could instruct the path disabling portion 28 directly not to transmit the uplink signal.

Also, although the embodiment described above is used to restrict the transmission of uplink signals from BTS 20 to BSC 30, it is possible alternatively (or in addition) to restrict the transmission of downlink signals from the BSC 30 to the BTS 20 via the fixed-network communications paths 5 based on the communications path performances of those different communications paths. In this case the path disabling portion 28 would be located in the BSC 30. The assessment portion could also be located in the BSC 30 but could possibly be located in the BTSs 20 or even be distributed with a part of it in each BTS 20 and a part of it in the BSC 30.

It is of course possible to have separate communications paths between the BTSs and the BSC for the uplink and downlink directions.

In the embodiments of the present invention described above, it was assumed that only one communications path was available between each BTS 20 and the BSC 30. Therefore selecting a particular BTS 20 was equivalent to selecting the communications path associated with BTS 20. It is possible, however, to have more than one available communications path between a BTS 20 and the BSC 30 (for example, both a fibre optic and microwave link may be available). In that case, the above-mentioned BTS selection message (BSM) should be a communication path selection message, and similarly the ranking message RM would contain rankings for each communications path available to each BTS.

Although the present invention has been described above in relation to the proposed European wideband. CDMA system (UTRA) it will be appreciated that it can also be applied to a system otherwise in accordance with the IS95 standard. It would also be possible to apply the invention in other cellular networks not using CDMA, for example networks using one or more of the following multiple-access techniques: time-division multiple access (TDMA), wavelength-division multiple access (WDMA), frequency-division multiple access (FDMA) and space-division multiple access (SDMA).

What we claim is:

1. A cellular mobile communications network including:
   a base station controller;
   an array of base transceiver stations, each having a communications path connecting it to said base station controller, such that when an uplink signal is received from a mobile station of the network by a plurality of the base transceiver stations of said array, each base transceiver station of said plurality can transfer the received uplink signal via its said communications path to said base station controller;
   a communications path assessment unit which assesses said communications paths according to one or more predetermined characteristics; and
   a communications path disabling unit operable, based on the assessment of the communications paths, to prevent at least one base transceiver station of said plurality from transferring the received uplink signal to said base station controller means.

2. A network as claimed in claim 1, wherein said communications path assessment unit is included in said base station controller.

3. A network as claimed in claim 1, wherein said communications path assessment unit is included in each of said base transceiver stations of said plurality.

4. A network as claimed in claim 1, wherein each base transceiver station of said plurality has such a communications path disabling unit and the disabling units cooperate to prevent at least one base transceiver station of said plurality from transferring the received uplink signal to said base station controller.

5. A network as claimed in claim 4, wherein said communications path assessment unit is operable to determine an order of ranking of the assessed communications paths according to said one or more predetermined characteristics and to inform the communications path disabling unit in each base transceiver station of said plurality of the rank, in the determined ranking order, of said communications path connecting that base transceiver station to the base station controller.

6. A network as claimed in claim 1, wherein said communications path assessment unit is included in said base station controller and in at least one of said base transceiver stations of said plurality.

7. A network as claimed in claim 1, further including:
a received uplink signal assessment unit for assessing the received uplink signal of at least one of the base transceiver stations of said plurality;
said communications path disabling unit being operable to employ both the communications-path assessment and the uplink-signal assessment in determining whether or not to prevent at least one base transceiver station of said plurality from transferring the received uplink signal to said base station controller.

8. A network as claimed in claim 7, wherein each base transceiver station of said plurality has such a received uplink signal assessment unit, and said mobile station is operable to provide the received uplink signal assessment unit in each base transceiver station of said plurality with a measure of the uplink channel performance of each other base transceiver station of said plurality.

9. A network as claimed in claim 1, wherein at least one base transceiver station of said plurality has two or more communications paths available for connecting it to the base station controller, and the network further includes an available path selection unit operable, when said communications path disabling unit determines that said transfer between its base transceiver station and the base station controller is to be made, to select one of said available communications paths.

10. A network as claimed in claim 9, wherein said communications path assessment unit is operable to assess each of said available communications paths, and said available path selection unit makes the selection from amongst said available communications paths based on said assessment of those paths by said communications path assessment unit.

11. A network as claimed in claim 9, wherein said available path selection unit makes the selection from amongst said available communications paths based on an assessment of the signal to be transferred between the base transceiver station and the base station controller.

12. A network as claimed in claim 11, wherein said available path selection unit makes said selection based on a traffic type of the signal to be transferred.

13. A network as claimed claim 1, wherein said communications path assessment unit is operable to examine signals propagating through said communications paths and to employ the results of the examination to assess at least one of said predetermined characteristics of said communications paths.

14. A network as claimed in claim 1, wherein said communications path assessment unit is operable to receive control signals generated by a communications path controller serving to monitor said communications paths, which control signals represent one or more measures of the performance of those communications paths, and are also operable to employ the received control signals to assess at least one of said predetermined characteristics of said communications paths.

15. A network as claimed in claim 1, further including:
a mobile switching centre connected to said base station controller and operable to apply to the base station controller control signals representing one or more measures of the performance of said communications paths, said communications path assessment unit being operable to employ the received control signals to assess at least one of said predetermined characteristics of said communications paths.

16. A network as claimed in claim 1, wherein said communications path assessment unit includes a storage device for storing one or more measures of the performance of each of said communications paths.

17. A network as claimed in claim 1, wherein said base transceiver stations of said plurality are base transceiver stations of said array involved in a soft hand-off operation with said mobile station.

18. A network as claimed in claim 1, wherein said one or more predetermined characteristics include one or more of the following characteristics:
congestion, availability, quality and cost of the communications paths.

19. A base station controller, for use in a cellular mobile communications network that includes an array of base transceiver stations, each having a communications path connecting it to the base station controller such that, when an uplink signal is received from a mobile station of the network by a plurality of the base transceiver stations of the array, each of those base transceiver stations can transfer the received uplink signal via its said communications path to the base station controller, which base station controller includes:
a communications path assessment unit which assesses said communications paths according to one or more predetermined characteristics; and
an informing unit which generates assessment signals indicating the results of the assessment of said communications paths and which transmits such assessment signals to the base transceiver stations of said plurality.

20. A base station controller as claimed in claim 19, wherein said base transceiver stations of said plurality are base transceiver stations of said array involved in a soft hand-off operation with said mobile station.

21. A base station controller as claimed in claim 19, wherein said one or more predetermined characteristics include one or more of the following characteristics:
congestion, availability, quality and cost of the communications paths.

22. A base transceiver station, for use in a cellular mobile communications network in which an array of base transceiver stations including the claimed base transceiver station are connected to a base station controller of the network by respective communications paths such that when an uplink signal is received from a mobile station by a plurality of the base transceiver stations of the array, each of those base transceiver stations can transfer the received uplink signal via its said communications path to said base station controller;

the claimed base transceiver station including:
a communications path disabling unit operable, based on an assessment of said communications paths according to one or more predetermined characteristics thereof, to prevent the claimed base transceiver station from transferring the received uplink signal to said base station controller.

23. A base transceiver station as claimed in claim 22, wherein the assessment of said communications paths is carried out externally of the base transceiver station and the results of the assessment are communicated to the base transceiver station by one or more assessment signals, and said communications path disabling unit is operable to receive such assessment signals and to employ them to determine whether or not to effect said transfer of the received uplink signal to said base station controller.

24. A base transceiver station as claimed in claim 22, wherein the base transceiver station further includes:
a communications path assessment unit which carries out the assessment of the communications paths according to said one or more predetermined characteristics.

25. A base transceiver station as claimed in claim 22, wherein said base transceiver stations of said plurality are base transceiver stations of said array involved in a soft hand-off operation with said mobile station.

26. A base transceiver station as claimed in claim 22, wherein said one or more predetermined characteristics include one or more of the following characteristics:
congestion, availability, quality and cost of the communications paths.

27. A communications method for use in a cellular mobile communications network that includes an array of base transceiver stations, each having a communications path connecting it to a base station controller of the network such that, when an uplink signal is received from a mobile station by a plurality of the base transceiver stations of the array, each of those base transceiver stations can transfer the received uplink signal via its said communications path to said base station controller;
in which communications method:
said communications paths are assessed according to one or more predetermined characteristics; and
based on the assessment of the communications paths at least one base transceiver station of said plurality is prevented from transferring the received uplink signal to the base station controller.

28. A communications method as claimed in claim 27, wherein said base transceiver stations of said plurality are base transceiver stations of said array involved in a soft hand-off operation with said mobile station.

29. A communications method as claimed in claim 27, wherein said one or more predetermined characteristics include one or more of the following characteristics:
congestion, availability, quality and cost of the communications paths.

30. A cellular mobile communications network including:
a base station controller;
an array of base transceiver stations, each having a communications path connecting it to said base station controller such that, when a downlink signal for transmission to a mobile station of the network is produced by said base station controller, that downlink signal can be transferred to a plurality of the base transceiver stations of said array via the respective said communications paths thereof;
a communications path assessment unit which assesses said communications paths according to one or more predetermined characteristics; and
a communications path disabling unit operable, based on the assessment of said communications paths, to prevent said base station controller from transferring said downlink signal to at least one of said base transceiver stations of said plurality.

31. A network as claimed in claim 30, wherein said communications path assessment unit is included in said base station controller.

32. A network as claimed in claim 30, wherein such a communications path assessment unit is included in each of said base transceiver stations of said plurality.

33. A network as claimed in claim 30, wherein said communications path assessment unit is included in said base station controller means and in at least one of said base transceiver stations of said plurality.

34. A network as claimed in claim 30, wherein at least one base transceiver station of said plurality has two or more communications paths available for connecting it to the base station controller, and the network further includes an available path selection unit operable, when said communications path disabling unit determines that said transfer between its base transceiver station and the base station controller is to be made, to select one of said available communications paths.

35. A network as claimed in claim 34, wherein said communications path assessment unit is operable to assess each of said available communications paths, and said available path selection unit makes the selection from amongst said available communications paths based on said assessment of those paths by said communications path assessment unit.

36. A network as claimed in claim 34, wherein said available path selection unit makes the selection from amongst said available communications paths based on an assessment of the signal to be transferred between the base transceiver station and the base station controller.

37. A network as claimed in claim 36, wherein said available path selection unit makes said selection based on a traffic type of the signal to be transferred.

38. A network as claimed claim 30, wherein said communications path assessment unit is operable to examine signals propagating through said communications paths and to employ the results of the examination to assess at least one of said predetermined characteristics of said communications paths.

39. A network as claimed in claim 30, wherein said communications path assessment unit is operable to receive control signals generated by a communications path controller serving to monitor said communications paths, which control signals represent one or more measures of the performance of those communications paths, and is also operable to employ the received control signals to assess at least one of said predetermined characteristics of said communications paths.

40. A network as claimed in claim 30, further including:
a mobile switching centre connected to said base station controller and operable to apply to the base station controller control signals representing one or more measures of the performance of said communications paths, said communications path assessment unit being operable to employ the received control signals to assess at least one of said predetermined characteristics of said communications paths.

41. A network as claimed in claim 30, wherein said communications path assessment unit includes a storage device for storing one or more measures of the performance of each of said communications paths.

42. A network as claimed in claim 30, wherein said base transceiver stations of said plurality are base transceiver stations of said array involved in a soft hand-off operation with said mobile station.

43. A network as claimed in claim 30, wherein said one or more predetermined characteristics include one or more of the following characteristics:
congestion, availability, quality and cost of the communications paths.

44. A base station controller, for use in a cellular mobile communications network that includes an array of base transceiver stations, each having a communications path connecting it to the base station controller such that, when a downlink signal for transmission to a mobile station of the network is produced by the base station controller, that signal can be transferred to a plurality of the base transceiver stations of the array via the respective said communications paths thereof, which base station controller includes:
a communications path disabling unit operable, based on an assessment of said communications paths according to one or more predetermined characteristics thereof, to prevent transfer of said downlink signal to at least one of said base transceiver stations of said plurality.

45. A base station controller as claimed in claim 44, wherein said assessment of the communications paths is carried out externally of the base station controller and the results of the assessment are communicated to the base station controller by one or more assessment signals, and said communications path disabling unit is operable to receive such assessment signals and to employ them to make the determination to prevent transfer of said downlink signal to at least one base transceiver station of said plurality.

46. A base station controller as claimed in claim 44, further including:
a communications path assessment unit which carries out said assessment of said communications paths according to said one or more predetermined characteristics.

47. A base station controller as claimed in claim 44, wherein said base transceiver stations of said plurality are base transceiver stations of said array involved in a soft hand-off operation with said mobile station.

48. A base station controller as claimed in claim 44, wherein said one or more predetermined characteristics include one or more of the following characteristics:
congestion, availability, quality and cost of the communications paths.

49. A base transceiver station, for use in a cellular mobile communications network in which an array of base transceiver stations including the claimed base transceiver station are connected to a base station controller of the network by respective communications paths such that, when a downlink signal for transmission to a mobile station of the network is produced by the base station controller, that signal can be transferred to a plurality of the base transceiver stations of the array via the respective said transmission paths thereof;
the claimed base transceiver station including:
a communications path assessment unit which assesses said communications path according to one or more predetermined characteristics; and
an informing unit which generates assessment signals indicating the results of the assessment of the communications paths and which transmits such assessment signals to the base station controller means.

50. A base transceiver station as claimed in claim 49, wherein said base transceiver stations of said plurality are base transceiver stations of said array involved in a soft hand-off operation with said mobile station.

51. A base transceiver station as claimed in claim 49, wherein said one or more predetermined characteristics include one or more of the following characteristics:
congestion, availability, quality and cost of the communications paths.

52. A communications method for use in a cellular mobile communications network that includes an array of base transceiver stations, each having a communications path connecting it to a base station controller of the network such that, when a downlink signal for transmission to a mobile station of the network is produced by the base station controller, that signal can be transferred to a plurality of the base transceiver stations of the array via the respective said communications paths thereof;
in which method:
said communications paths are assessed according to one or more predetermined characteristics thereof; and
based on the assessment of the communications paths, the base station controller is prevented from transferring said downlink signal to at least one of the base transceiver stations of said plurality.

53. A communications method as claimed in claim 52, wherein said base transceiver stations of said plurality are base transceiver stations of said array involved in a soft hand-off operation with said mobile station.

54. A communications method as claimed in claim 52, wherein said one or more predetermined characteristics include one or more of the following characteristics:
congestion, availability, quality and cost of the communications paths.

* * * * *